US010310263B2

(12) United States Patent
Nakayama et al.

(10) Patent No.: US 10,310,263 B2
(45) Date of Patent: Jun. 4, 2019

(54) COMBINER RAISING/LOWERING DEVICE AND HEADUP DISPLAY DEVICE

(71) Applicant: Panasonic Intellectual Property Management Co., Ltd., Osaka (JP)

(72) Inventors: Kenji Nakayama, Osaka (JP); Kousuke Sasaki, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/579,620

(22) PCT Filed: Apr. 21, 2016

(86) PCT No.: PCT/JP2016/002140
§ 371 (c)(1),
(2) Date: Dec. 5, 2017

(87) PCT Pub. No.: WO2017/002290
PCT Pub. Date: Jan. 5, 2017

(65) Prior Publication Data
US 2018/0149868 A1    May 31, 2018

(30) Foreign Application Priority Data

Jun. 29, 2015  (JP) ................ 2015-129875

(51) Int. Cl.
*G02B 27/01* (2006.01)
*B60K 35/00* (2006.01)
*B60K 37/04* (2006.01)
(52) U.S. Cl.
CPC .......... *G02B 27/0149* (2013.01); *B60K 35/00* (2013.01); *B60K 37/04* (2013.01);
(Continued)

(58) Field of Classification Search
CPC ...... G02B 27/0149; G02B 27/01; G02B 7/18; G02B 7/182; G02B 2027/0154; B60K 35/00; B60K 37/04
See application file for complete search history.

(56) References Cited

U.S. PATENT DOCUMENTS

| 2008/0285138 A1 | 11/2008 | Lebreton |
| 2016/0147066 A1 | 5/2016 | Ogasawara et al. |
| 2017/0023177 A1* | 1/2017 | Yomogita ............ F16M 11/046 |

FOREIGN PATENT DOCUMENTS

| EP | 2762364 | 8/2014 |
| JP | 6-191352 | 7/1994 |

(Continued)

OTHER PUBLICATIONS

International Search Report of PCT application No. PCT/JP2016/002140 dated Jun. 14, 2016.

*Primary Examiner* — Ryan D Howard
(74) *Attorney, Agent, or Firm* — Greenblum & Bernstein, P.L.C.

(57) ABSTRACT

A combiner lifting device includes: a support unit that includes a first pin and a second pin, and supports a combiner; and two side surface portions disposed on both sides of the combiner, respectively. Each of the side surface portions includes a first groove along which the first pin slides, and a second groove along which the second pin slides. The side surface portions support the support unit in such a manner that the support unit is rotatable around the first pin when the first pin is located at an end of the first groove.

14 Claims, 10 Drawing Sheets

(52) U.S. Cl.
CPC .............. *B60K 2350/2052* (2013.01); *B60K 2350/405* (2013.01); *G02B 2027/0154* (2013.01)

(56) References Cited

FOREIGN PATENT DOCUMENTS

| | | |
|---|---|---|
| JP | 5020252 B | 9/2012 |
| JP | 2014-058299 | 4/2014 |
| JP | 2014-164234 | 9/2014 |
| JP | 2014-202834 | 10/2014 |
| JP | 2015-006832 | 1/2015 |
| JP | 2015-219356 | 12/2015 |
| WO | 2010/026680 | 3/2010 |

\* cited by examiner

COMBINER RAISING/LOWERING DEVICE AND HEADUP DISPLAY DEVICE

This application is a U.S. national stage application of the PCT International Application No. PCT/JP2016/002140 filed on Apr. 21, 2016, which claims the benefit of foreign priority of Japanese patent application No. 2015-129875 filed on Jun. 29, 2015, the contents all of which are incorporated herein by reference.

TECHNICAL FIELD

The present disclosure relates to a combiner lifting device and a head-up display device.

BACKGROUND ART

A head-up display (HUD) mounted to automobiles or other types of vehicles has been known. There has been further known an example of a head-up display which displays information on a combiner to assist a driver. The combiner is disposed in front of the driver in a raised state. Accordingly, even while the driver is not using the combiner, the raised combiner enters a front viewing field of the driver and bothers the driver in driving, for example.

For overcoming this problem, it has become known to provide a mechanism performing a storage function which stores the combiner within an instrumental panel (also called dashboard) while the combiner is not used, and an angle adjustment function (tilt function) which adjusts an angle of the combiner while the combiner is used. For example, PTL 1 discloses a mechanism which performs both the storage function and the tilt function with only one motor.

CITATION LIST

Patent Literature

PTL 1: Japanese Patent No. 5020252

SUMMARY OF THE INVENTION

A combiner lifting device according to an aspect of the present disclosure includes a support unit that includes a first projection and a second projection, and supports a combiner. The combiner lifting device further includes two side surface portions disposed on both sides of the combiner, respectively. Each of the side surface portions is provided with a first groove along which the first projection slides, and a second groove along which the second projection slides. The respective side surface portions support the support unit in such a manner that the support unit is rotatable around the first projection when the first projection is located at an end of the first groove.

The present disclosure can provide a combiner lifting device having a simple structure.

DESCRIPTION OF EMBODIMENT

Prior to describing an exemplary embodiment of the present invention, a problem arising from a conventional device is herein briefly touched upon. A problem of structural complication has been arising from the mechanism of PTL 1.

An object of the present disclosure is to provide a combiner lifting device having a simple structure.

An exemplary embodiment of the present disclosure will be hereinafter described with reference to the drawings.

[Configuration of Head-up Display Device 100]

Figure 1:
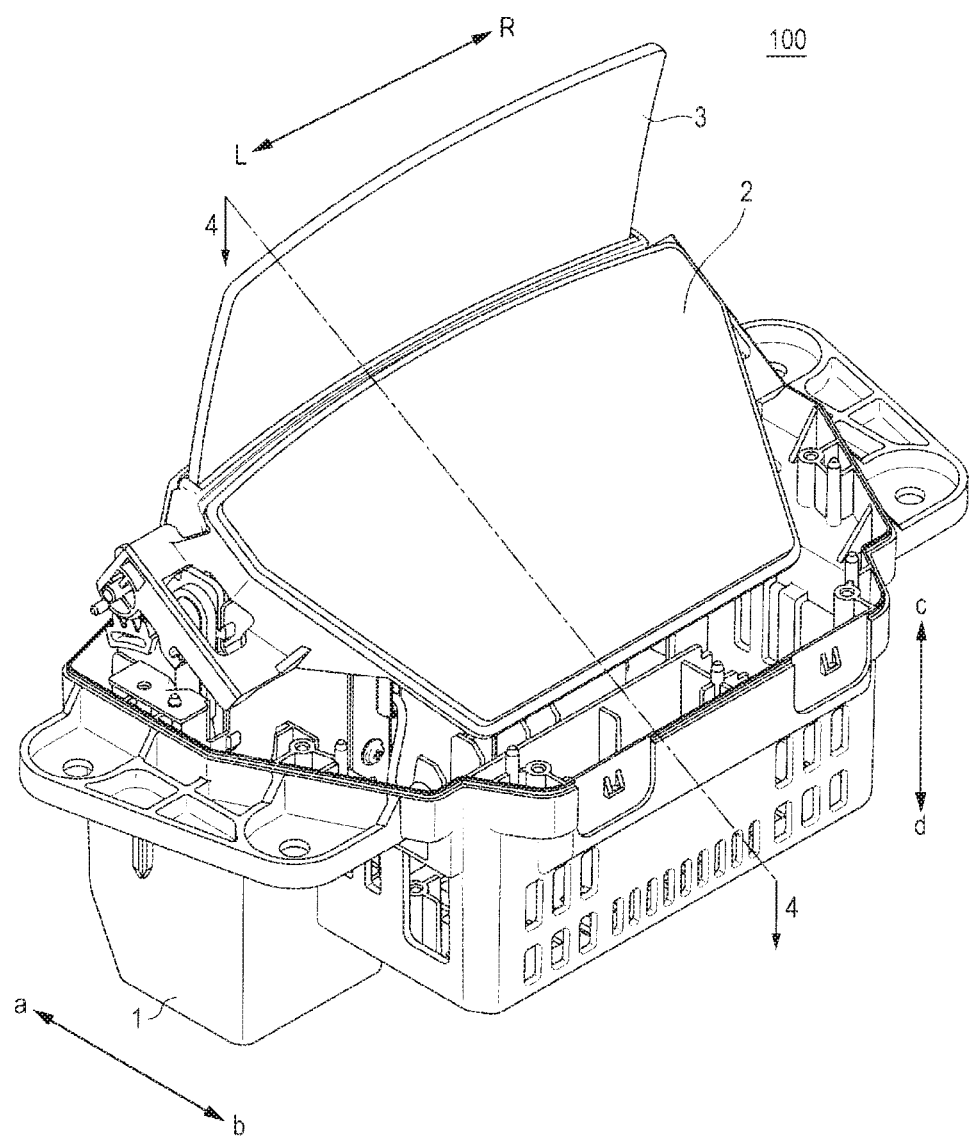
FIG. 1 is a perspective view illustrating an external appearance of a head-up display device in a raised state according to an exemplary embodiment.
Figure 2:
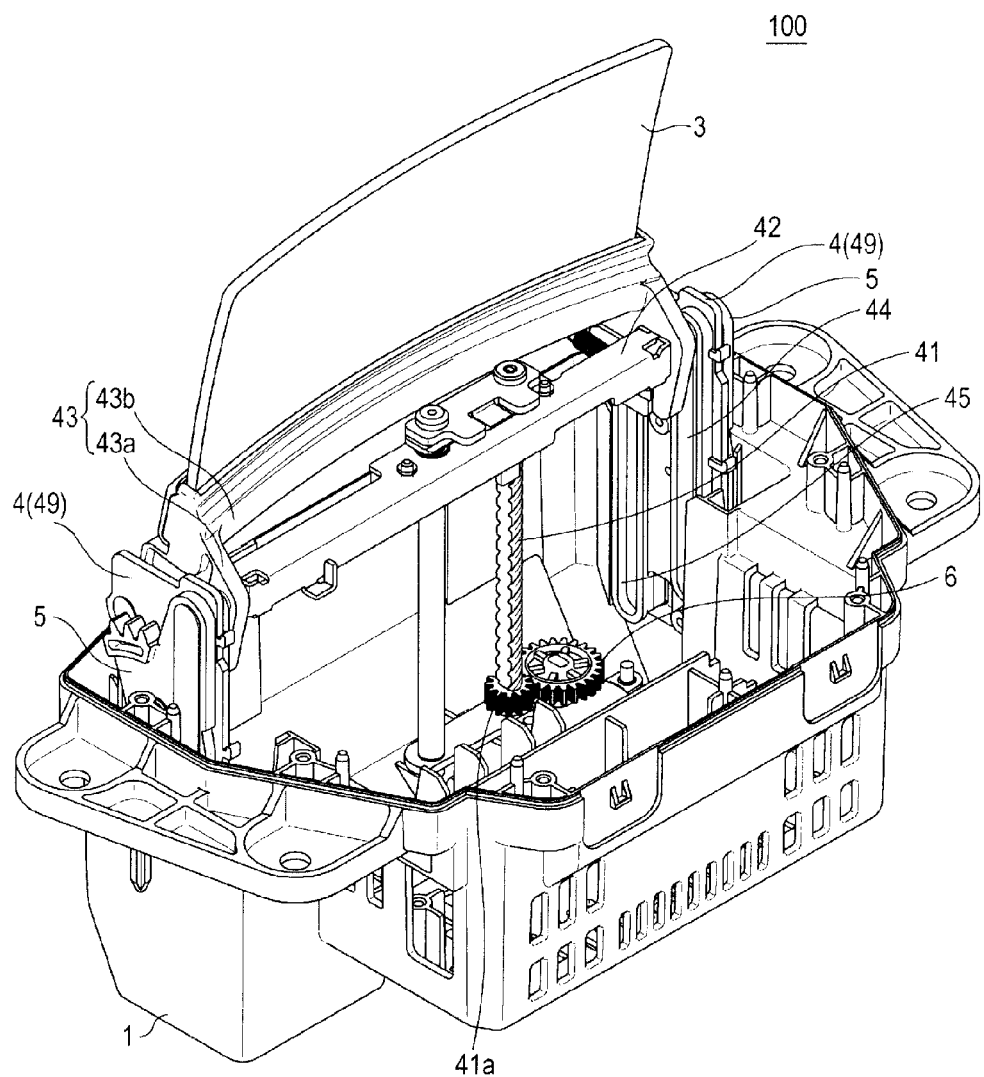
FIG. 2 is a perspective view illustrating an external appearance of the head-up display device in the raised state according to the exemplary embodiment.
Figure 3:
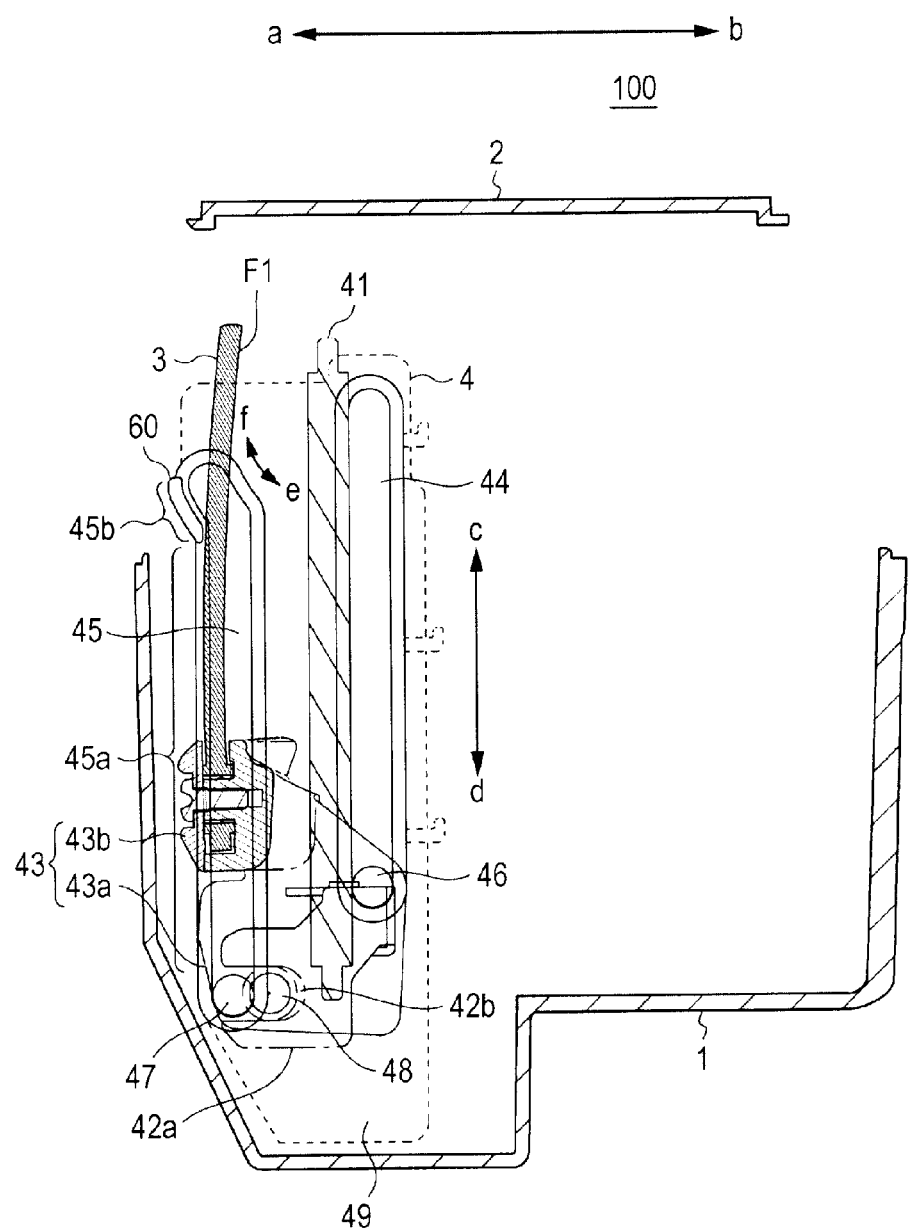
FIG. 3 is a side cross-sectional view illustrating an interior of the head-up display device in a stored state according to the exemplary embodiment.
Figure 4:
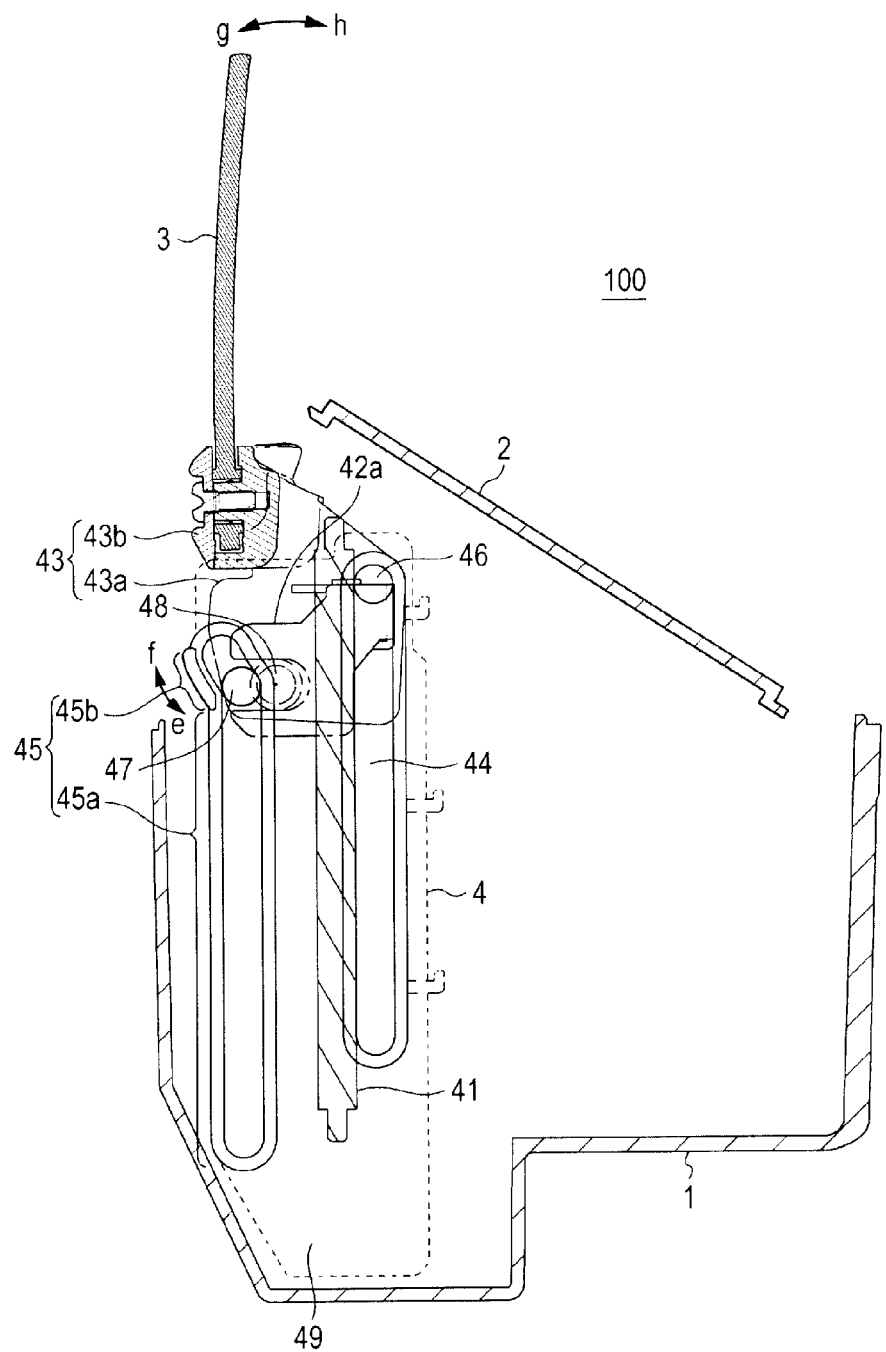
FIG. 4 is a side cross-sectional view illustrating the interior of the head-up display device in the raised state according to the exemplary embodiment.

A configuration example of head-up display device 100 according to the present exemplary embodiment is initially described with reference to FIGS. 1 through 4. FIG. 1 is a perspective view illustrating an external appearance of head-up display device 100. FIG. 2 is a perspective view of an external appearance of head-up display device 100 illustrated in FIG. 1 from which cover 2 is removed. FIG. 4 is a cross-sectional view taken along line 4-4 in FIG. 1 and FIG. 3 shows the same cross section in a stored state described below.

Head-up display device 100 illustrated in FIG. 1 is provided on an instrumental panel (also called dashboard) of a vehicle, for example.

A state of combiner 3 is switchable between a stored state, a raised state, and an angle adjustable state in accordance with a lifting/lowering action of combiner 3 achieved by head-up display device 100. For example, a user issues an instruction for driving an electric motor so as to switch the state of combiner 3 between the stored state, raised state, and angle adjustable state.

In the stored state, combiner 3 is stored in housing 1 of head-up display device 100. In the raised state, combiner 3 is raised. In the angle adjustable state, inclination of combiner 3 in the raised state is adjustable to fit to an angle desired by the user.

The state of combiner 3 is switchable from the stored state to the raised state, or from the raised state to the stored state. The state of combiner 3 is also switchable from the raised state to the angle adjustable state, or from the angle adjustable state to the raised state. FIGS. 1, 2, and 4 illustrate the raised state of combiner 3, while FIG. 3 illustrates the stored state of combiner 3.

As illustrated in FIGS. 1 through 4, head-up display device 100 includes housing 1, cover 2, combiner 3, combiner lifting device 4, and cover opening/closing mechanisms 5.

Housing 1 houses combiner 3, combiner lifting device 4, and cover opening/closing mechanisms 5. Housing 1 further houses a projection device (not shown) in a rear side of the vehicle. In FIGS. 1 and 3, arrow "a" indicates a direction toward a front of the vehicle, while arrow "b" indicates a direction toward a rear of the vehicle.

Cover 2 is configured to cover an upper part of housing 1 (see FIGS. 1 and 3). Cover 2 performs an opening/closing action in linkage with a lifting/lowering action of combiner 3. The opening/closing action of cover 2 will be detailed below.

Parts lower than cover 2 are embedded in the instrumental panel in the stored state of combiner 3 (e.g., FIG. 3). It is preferable that an upper surface of cover 2 and a surface of the instrumental panel become substantially horizontal in this state. Accordingly, head-up display device 100 does not block a viewing field of the driver in the stored state of combiner 3.

For example, combiner 3 is a half mirror, constituted by plate glass, and an optical semi-transparent film, such as tin and silver, deposited on one surface of the plate glass. Combiner 3 has semi-transparency to allow the user to visually recognize the front of the vehicle through combiner 3.

An image is projected onto projection surface F1 of combiner 3 illustrated in FIG. 3 from the projection device (not shown) housed in housing 1 in the raised state or the angle adjustable state of combiner 3. The user views the image projected on combiner 3 and superimposed on scenery in front of the vehicle. For example, this image is an image showing a vehicle speed, a residual quantity of fuel, or the like of the vehicle, or an image showing a distance to a destination, a traveling direction, a current place name, an institution located around the current place, a store name, or the like.

Combiner lifting device 4 is housed in housing 1 at a front side of the vehicle. Combiner lifting device 4 lifts and lowers combiner 3 by utilizing power of the electric motor in accordance with an operation performed by the user (driver or fellow passenger).

As illustrated in FIG. 2, combiner lifting device 4 includes feed screw 41 and movable unit 42. Feed screw 41 includes gear 41a, and engages with motor gear 6 which rotates in accordance with rotation of the electric motor (not shown). Feed screw 41 rotates in accordance with rotation of motor gear 6. Feed screw 41 and movable unit 42 constitute a feed mechanism which shifts movable unit 42 in an upward-downward direction of housing 1 in accordance with rotation of feed screw 41. The upward direction of housing 1 is a direction indicated by arrow "c" in FIG. 1, while the downward direction of housing 1 is a direction indicated by arrow "d" in FIGS. 1 and 3.

As illustrated in FIGS. 3 and 4, combiner bracket 42a is provided at each end of movable unit 42 in a left-right direction of housing 1. The right direction of housing 1 is a direction indicated by arrow "II" in FIG. 1, while the left direction of housing 1 is a direction indicated by arrow "L" in FIG. 1.

As illustrated in FIG. 3, notch 42b is formed in each combiner bracket 42a. Each of third pins 48, which are provided on support unit 43 described below, is inserted into notch 42b. In the state that each of third pin 48 is inserted in notch 42b, upward and downward movement power of movable unit 42 produced by the feed mechanism is transmitted to support unit 43 via combiner bracket 42a to lift or lower combiner 3.

As illustrated in FIG. 2, combiner lifting device 4 further includes two side surface portions 49. One of side surface portions 49 is indicated by dotted line in FIG. 3. Side surface portions 49 are respectively disposed on both sides of combiner 3 (both ends of combiner lifting device 4 in the left-right direction). First groove 44 and second groove 45 are formed in a surface of each of side surface portions 49 of combiner lifting device 4 on a surface (i.e., an inner surface) in contact with support unit 43 described below.

First groove 44 is formed linearly in the upward-downward direction of housing 1 (direction of arrow "c" or arrow "d", i.e., lifting/lowering direction of combiner 3). First groove 44 is an area where first pin. 46 (example of first projection) provided on support unit 43 slides at the time of switching of combiner 3 between the stored state and the raised state.

Second groove 45 is an area where second pin 47 (example of second projection) provided on support unit 43 slides during the lifting/lowering action of combiner 3 and the angle adjustment action of combiner 3. Second groove 45 includes lifting/lowering groove area 45a (example of second groove area), and angle adjustment groove area 45b (example of first groove area).

Lifting/lowering groove area 45a is linearly formed in parallel with first groove 44 and in the upward-downward direction of housing 1 (direction of arrow "c" or arrow "d", i.e., lifting/lowering direction of combiner 3). More specifically, lifting/lowering groove area 45a is an area where second pin 47 slides when combiner 3 switches between the stored state and the raised state. For example, a length of lifting/lowering groove area 45a in the direction of arrow "c" or "d" is equivalent to a length of first groove 44 in the direction of arrow "c" or "d". First pin 46 and second pin 47 simultaneously shift along first groove 44 and lifting/lowering groove area 45a, respectively.

Angle adjustment groove area 45b is communicated with lifting/lowering groove area 45a, and forms an area where second pin 47 slides in the angle adjustable state of combiner 3. For example, as illustrated in FIG. 4, angle adjustment groove area 45b is an area where second pin 47 slides when support unit 43 turns in a direction of arrow "e" or "f" around first pin 46 located at an upper end of first groove 44.

Combiner lifting device 4 includes support unit 43. At each end of combiner lifting device 4, support unit 43 is provided in a space between side surface portion 49 (portion indicated by dotted line in FIG. 3) and combiner bracket 42a.

Support unit 43 includes bodies 43a and combiner holding portion 43b. Each of bodies 43a is provided with first pin 46 and second pin 47 on a surface (i.e., an outer surface) facing side surface portion 49, while each of bodies 43a is provided with third pin 48 on a surface (i.e., an inner surface) facing combiner bracket 42a. First pin 46 is inserted into first groove 44, while second pin 47 is inserted into second groove 45. On the other hand, third pin 48 is inserted into notch 42b of combiner bracket 42a. Combiner holding portion 43b fixes and supports combiner 3. As illustrated in FIG. 4, support unit 43 turns in a direction of arrow "e" or "f" around first pin 46 when first pin 46 is located at the upper end of first groove 44. In other words, two side surface portions 49 of combiner lifting device 4 support unit 43 in a manner that support unit 43 is turnable around first pin 46 when first pin 46 is located at the end of first groove 44.

The configuration example of head-up display device 100 has been described.

[Action of Combiner Lifting Device 4]

An action of combiner lifting device 4 is hereinafter detailed. Discussed herein are an action performed at the switching from the stored state to the raised state, or from the raised state to the stored state of combiner 3 (hereinafter referred to as action example 1), and an action performed in the angle adjustable state of combiner 3 (hereinafter referred to as action example 2).

<Action Example 1: Action at switching of combiner 3 between stored state and raised state>

Action example 1 is now described with reference to FIGS. 3 and 4. As described above, FIG. 3 is a cross-sectional view of head-up display device 100 illustrating the stored state of combiner 3. On the other hand, FIG. 4 is a cross-sectional view of head-up display device 100 in the same cross section as FIG. 3, illustrating the raised state of combiner 3.

When combiner bracket 42*a* shifts in the upward direction of housing 1 (direction of arrow "c") by driving of the electric motor from the stored state of combiner 3 illustrated in FIG. 3, first pin 46 located at the lower end of first groove 44, and second pin 47 located at the lower end of second groove 45 (lifting/lowering groove area 45*a*) shift in the direction of arrow "c" accordingly. First pin 46 and second pin 47 are capable of simultaneously shifting in the direction of arrow "c" until first pin 46 reaches the upper end of first groove 44 (state illustrated in FIG. 4).

When first pin 46 and second pin 47 shift in the upward direction of housing 1 (direction of arrow "c"), bodies 43*a* and combiner holding portion 43*b* also shift in the upward direction of housing 1. Accordingly, combiner 3 fixed to combiner holding portion 43*b* also shifts in the upward direction of housing 1 to come into the raised state illustrated in FIG. 4. In the raised state of combiner 3 illustrated in FIG. 4, first pin 46 is located at the upper end of first groove 44, while second pin 47 is located at a position close to a boundary between lifting/lowering groove area 45*a* and angle adjustment groove area 45*b*. In the raised state thus achieved, the user is capable of viewing an image projected onto projection surface F1.

When combiner bracket 42*a* shifts in the downward direction of housing 1 (direction of arrow "d") by driving of the electric motor from the raised state of combiner 3 illustrated in FIG. 4, first pin 46 located at the upper end of first groove 44, and second pin 47 located at the position close to the boundary between lifting/lowering groove area 45*a* and angle adjustment groove area 45*b* of second groove 45 shift in the direction of arrow "d" accordingly. First pin 46 and second pin 47 are capable of simultaneously shifting in the direction of arrow "d" until first pin 46 and second pin. 47 reach the lower end of first groove 44 and the lower end of second groove 45, respectively (state illustrated in FIG. 3).

When first pin 46 and second pin 47 shift in the downward direction of housing 1 (direction of arrow d), bodies 43*a* and combiner holding portion 43*b* shift in the downward direction of housing 1 accordingly. As a result, combiner 3 fixed to combiner holding portion 43*b* also shifts in the downward direction of housing 1 to come into the stored state illustrated in FIG. 3.

As described above, at the time of switching of combiner 3 between the stored state and the raised state, first pin 46 and second pin 47 simultaneously shift upward or downward along first groove 44 and lifting/lowering groove area 45*a*, respectively, to allow combiner 3 supported by support unit 43 to perform the lifting/lowering action in the direction of arrow "c" or "d". The storage function for storing combiner 3 is thus achievable.

<Action Example 2: Action in angle adjustable state of combiner 3>

Figure 5:
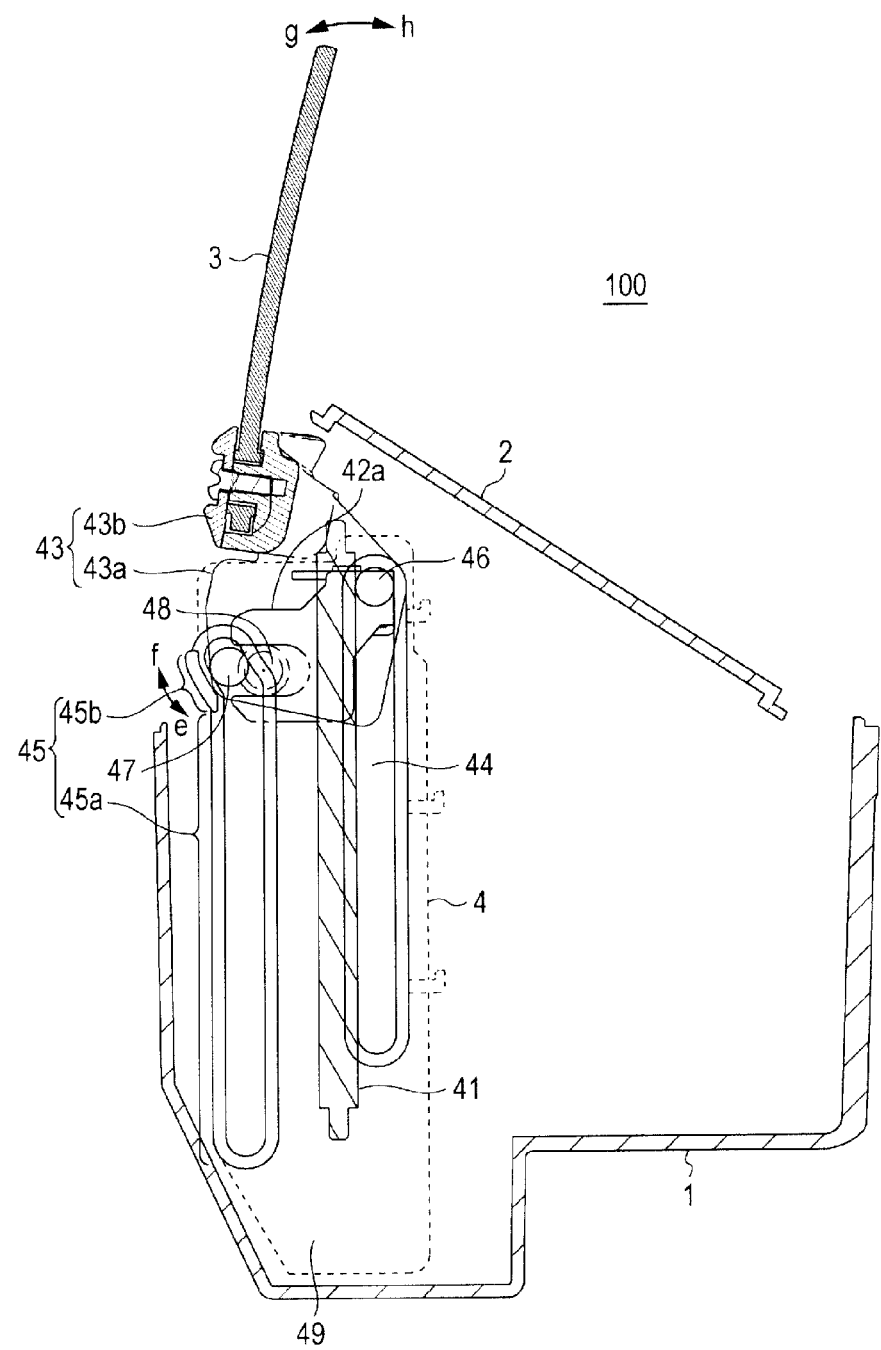
FIG. 5 is a side cross-sectional view illustrating the interior of the head-up display device in an angle adjustable state according to the exemplary embodiment.
Figure 6:
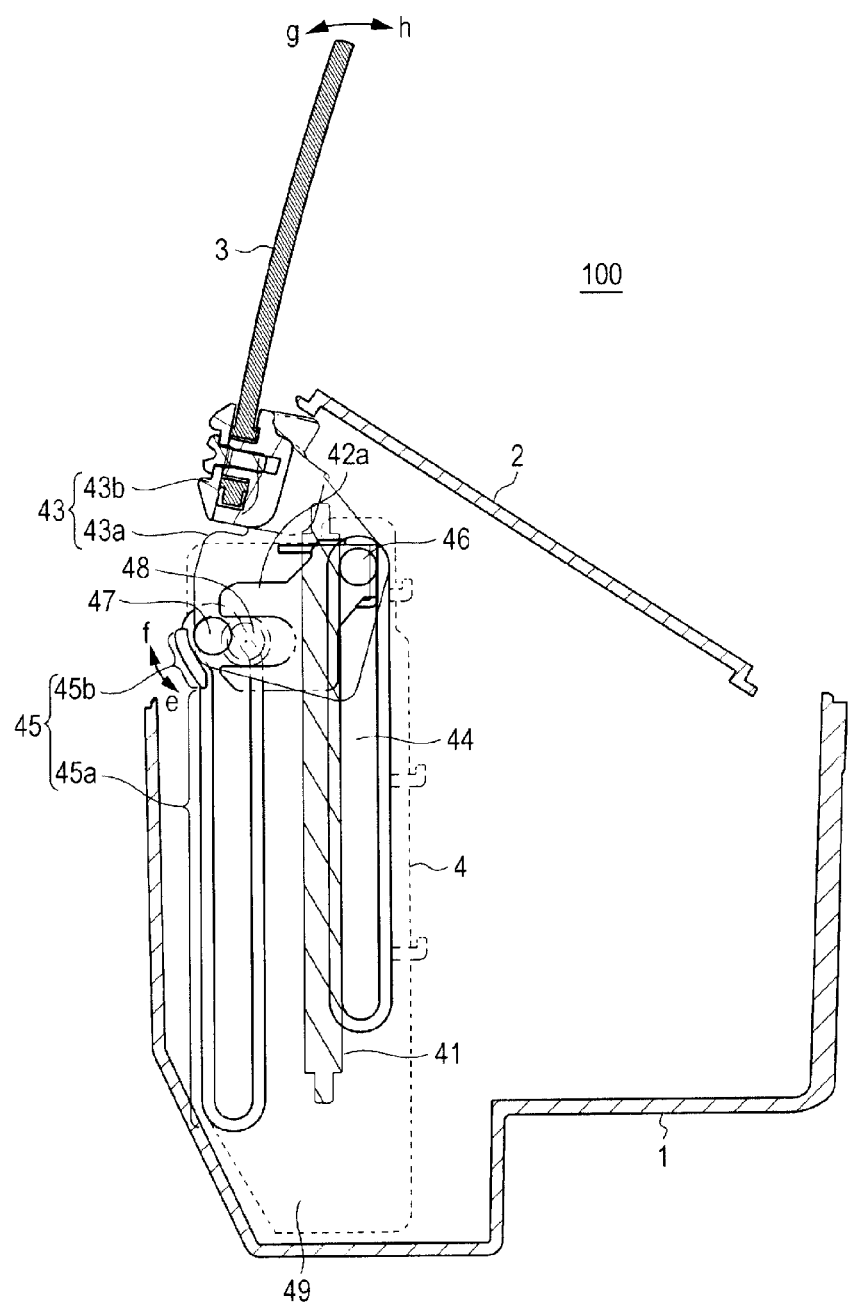
FIG. 6 is a side cross-sectional view illustrating the interior of the head-up display device in the angle adjustable state according to the exemplary embodiment.
Figure 7:
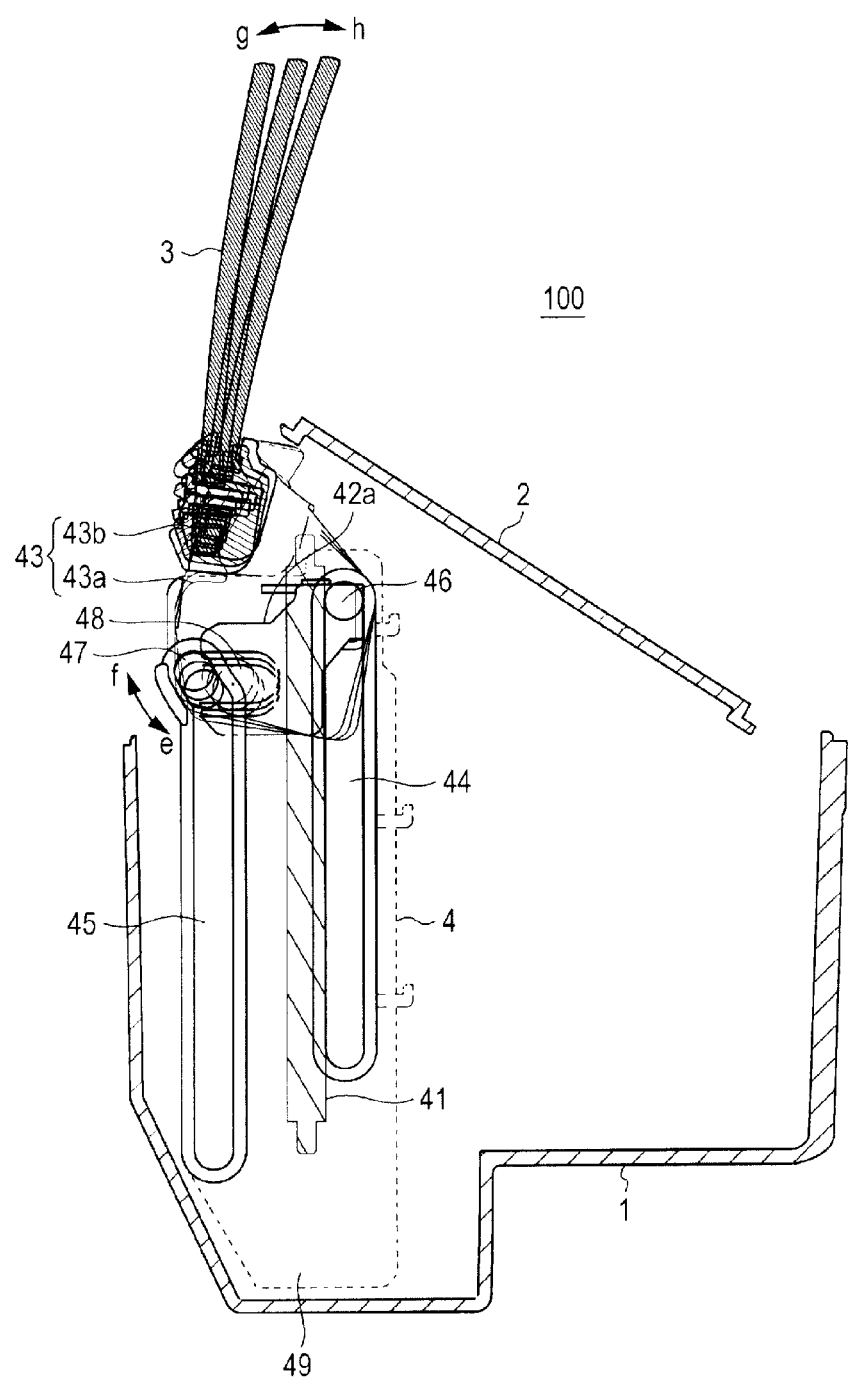
FIG. 7 is a side cross-sectional view illustrating the interior of the head-up display device in the angle adjustable state according to the exemplary embodiment.

Action example 2 is now described with reference to FIGS. 4 through 7. FIG. 4 is a cross-sectional view of head-up display device 100 illustrating the raised state of combiner 3. FIG. 5 is a cross-sectional view of head-up display device 100 in the same cross section as FIG. 4, illustrating a state that combiner 3 is inclined at a predetermined angle. FIG. 6 is a cross-sectional view of head-up display device 100 in the same cross section as FIG. 4, illustrating a state that combiner 3 is inclined at a maximum angle. FIG. 7 is a view collectively illustrating the respective states of combiner 3 shown in FIGS. 4 through 6.

As described above, in the raised state of combiner 3 illustrated in FIG. 4, first pin 46 is located at the upper end of first groove 44, while second pin 47 is located at the position close to the boundary between lifting/lowering groove area 45*a* and angle adjustment groove area 45*b* of second groove 45.

Even when combiner bracket 42*a* further shifts in the upward direction of housing 1 (direction of arrow "c") from the state illustrated in FIG. 4 by driving of the electric motor, first pin 46 is kept pressed against the upper end of first groove 44 without shifting.

On the other hand, second pin 47 shifts in the direction of arrow "f" along angle adjustment groove area 45*b* as illustrated in FIG. 5 when combiner bracket 42*a* further shifts in the upward direction of housing 1 (direction of arrow "c") from the state illustrated in FIG. 4 by driving of the electric motor. This shift of second pin 47 in the direction of arrow "f" is a rotational action in a clockwise direction (direction of arrow "f") around first pin 46, which serves as a rotation axis (a pivot point), located at the upper end of first groove 44.

When second pin 47 turns in the direction of arrow "f", bodies 43*a* and combiner holding portion 43*b* turn in the direction of arrow "f" accordingly. As a result, combiner 3 fixed to combiner holding portion 43*b* also turns in the clockwise direction (direction of arrow "h"). This rotational action achieves angle adjustment of combiner 3 in the direction of arrow "h" from the state illustrated in FIG. 4 to the state illustrated, for example, in FIGS. 5 and 6 (see FIG. 7).

The turn of second pin 47 around first pin 46 as the pivot point in the direction of arrow "f" achieves angle adjustment of combiner 3 up to an arrival of second pin 47 at the end of angle adjustment groove area 45*b* (state illustrated in FIG. 6). Accordingly, the allowable range of angle adjustment of combiner 3 depends on a length of angle adjustment groove area 45*b* in the sliding direction of second pin 47. For example, an allowable maximum rotation angle of combiner 3 in the direction of arrow h from the raised state is an angle of 13 degrees.

On the other hand, second pin 47 shifts in the direction of arrow "e" along angle adjustment groove area 45*b* when combiner bracket 42*a* shifts in the downward direction of housing 1 (direction of arrow "d") from the angle adjustable state illustrated in FIG. 5 or 6 by driving of the electric motor. This shift of second pin 47 in the direction of arrow "e" is a rotational action in an anticlockwise direction (direction of arrow "e") around first pin 46, which serves as the rotation axis (the pivot point), located at the upper end of first groove 44.

When second pin 47 turns in the direction of arrow "e", bodies 43a and combiner holding portion 43b turn in the direction of arrow "e" accordingly. As a result, combiner 3 fixed to combiner holding portion 43b also turns in the anticlockwise direction (direction of arrow "g"). This rotational action achieves angle adjustment of combiner 3 in the direction of arrow "g" from the state illustrated in FIG. 5 or 6 to the raised state illustrated in FIG. 4 (see FIG. 7).

When the angle of combiner 3 comes to a desired angle, and revolutions of the electric motor come to a stop, the angle of combiner 3 is maintained at the desired angle.

As described above, in the angle adjustable state of combiner 3, first pin 46 fixed to the upper end of first groove 44 functions as the rotation axis, while second pin 47 shifts in the direction of arrow "e" or "f" along angle adjustment groove area 45b. Thereby, combiner 3 supported by support unit 43 performs the rotational action in the direction of arrow "g" or "h". As a result, the tilt function of combiner 3 is achievable.

Action examples of head-up display device 100 have been described.

According to the present exemplary embodiment, combiner lifting device 4 includes two grooves (first groove 44 and second groove 45), and support unit 43 configured to support combiner 3 include two pins (first pin 46 and second pin 47). Combiner lifting device 4 achieves the lifting/lowering action of combiner 3 by the simultaneous slide of the two pins along the corresponding two grooves. Moreover, combiner lifting device 4 achieves the rotational action of combiner 3 by the slide of second pin 47 along second groove 45 (angle adjustment groove area 45b) around first pin 46, which serves as the rotation axis, located at the upper end of first groove 44.

According to this configuration, combiner 3 is supported by support unit 43 each including first pin 46 and second pin 47. Support unit 43 is supported by a corresponding one of two side face portions 49 each including first groove 44 along which first pin 46 slides, and second groove 45 along which second pin 47 slides. Support unit 43 is supported in such a manner as to be turnable around first pin 46 when first pin 46 is located at the end of first groove 44.

According to the present exemplary embodiment, therefore, the state of combiner 3 is switchable between the stored state, the raised state, and the angle adjustable state by the simple structure including the two grooves and the two pins as described above.

Moreover, according to the present exemplary embodiment, combiner lifting device 4 switches the action of combiner 3 between the lifting/lowering action and the rotational action in accordance with driving of one electric motor by the relationship in length and shape between first groove 44 and second groove 45 (lifting/lowering groove area 45a and angle adjustment groove area 45b). This configuration eliminates the necessity of providing different mechanisms for the lifting/lowering action (storage function) and the rotational action (tilt function) of combiner 3 in combiner lifting device 4. Accordingly, combiner lifting device 4 can be decreased in size particularly in the front-rear direction of the vehicle corresponding to the turn direction of combiner 3. Accordingly, the present exemplary embodiment achieves compact installation of combiner lifting device 4 in head-up display device 100, thereby reducing manufacturing costs of head-up display device 100.

[Opening/Closing Action of Cover 2]

An opening/closing action of cover 2 is hereinafter described in detail with reference to FIGS. 1, 2, 8 and 9.

Figure 8:
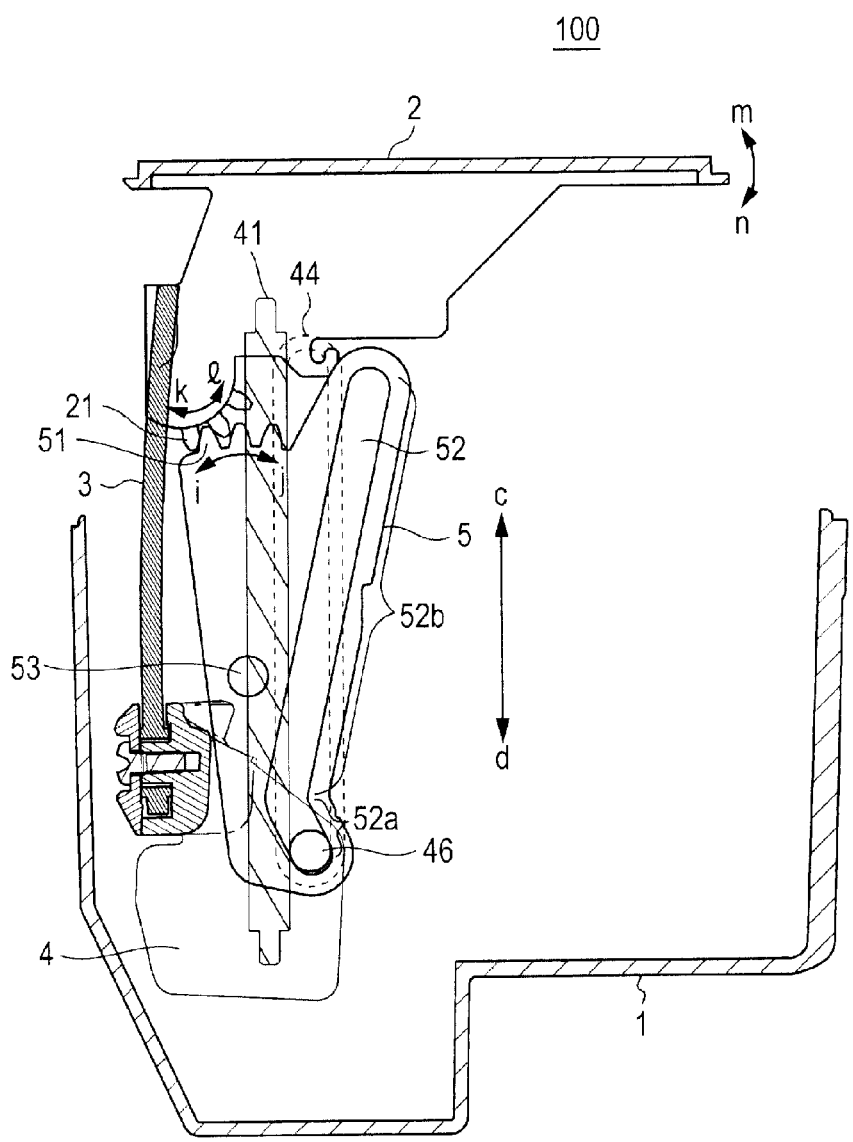
FIG. 8 is a side cross-sectional view illustrating the interior of the head-up display device in the stored state in a part associated with a cover opening/closing action according to the exemplary embodiment.
Figure 9:
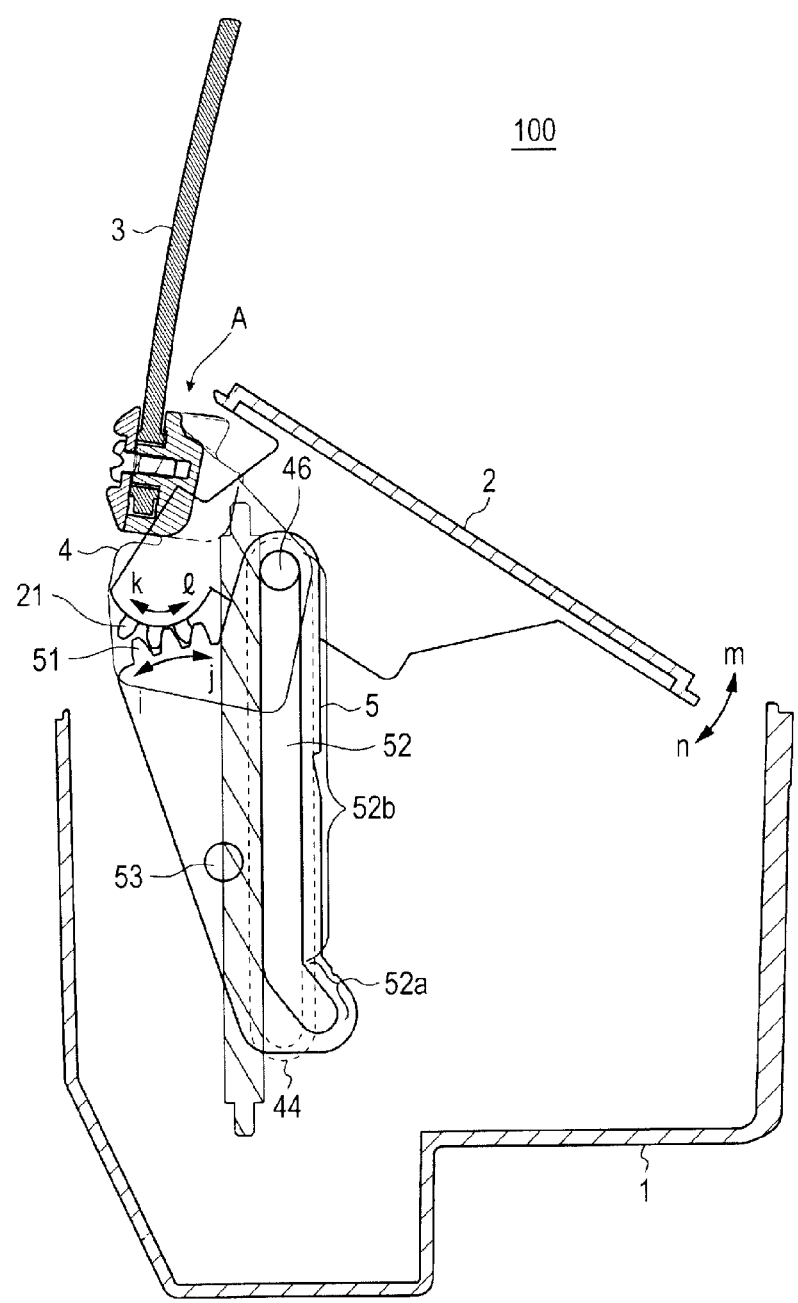
FIG. 9 is a side cross-sectional view illustrating the interior of the head-up display device in the raised state in the part associated with the cover opening/closing action according to the exemplary embodiment.

FIG. 8 is a cross-sectional view of head-up display device 100 illustrating the stored state of combiner 3 (closed state of cover 2). FIG. 9 is a cross-sectional view of head-up display device 100 illustrating the raised state of combiner 3 (opened state of cover 2).

Cover 2 includes first gear units 21 each of which engages with second gear unit 51 of corresponding cover opening/closing mechanism 5 described below. Cover 2 turns according to rotational driving produced by cover opening/closing mechanisms 5 and transmitted to cover 2 via first gear units 21. More specifically, when each of first gear units 21 rotates in directions of arrow "k" and arrow "l", an upper part of cover 2 turns in directions of arrow "n" and arrow "m", respectively.

As illustrated in FIG. 2, cover opening/closing mechanisms 5 are provided on the outer sides of combiner lifting device 4 (side surface portions 49) in the left-right direction of housing 1. As illustrated in FIGS. 8 and 9, each cover opening/closing mechanism 5 includes second gear unit 51, third groove 52, and rotation shaft 53. Each cover opening/closing mechanism 5 turns in directions of arrow "i" and arrow "j" around rotation shaft 53.

Second gear unit 51 engages with first gear unit 21 provided on cover 2.

First pin 46 provided on support unit 43 of combiner lifting device 4 is inserted in third groove 52. For example, first groove 44 is a bore formed in the side surface of combiner lifting device 4 so that first pin 46 provided on support unit 43 can penetrate first groove 44 and fit into third groove 52.

Third groove 52 includes first groove area 52a (example of at least a part of third groove), and second groove area 52b. First groove area 52a and second groove area 52b are communicated with each other. An extension direction of first groove area 52a is different from an extension direction of first groove 44.

When combiner bracket 42a illustrated in FIG. 3 shifts in the upward direction of housing 1 (direction of arrow "c") by driving of the electric motor from the stored state of combiner 3 illustrated in FIG. 8, first pin 46 located at the lower end of first groove 44 of combiner lifting device 4 also shifts in the upward direction of housing 1. During the shift of first pin 46 in the upward direction of housing 1 along first groove 44, first pin 46 simultaneously slides in third groove 52 of cover opening/closing mechanism 5.

At this time, first pin 46 shifting along first groove 44 formed in fixed combiner lifting device 4 does not deviate in the direction of arrow "i" or arrow "j" from the direction of arrow "c". Accordingly, as illustrated in FIGS. 8 and 9, cover opening/closing mechanism 5 rotatably supported around rotation shaft 53 turns in the direction of arrow "i" around rotation shaft 53 in accordance with the shift of first pin 46 in the direction of arrow "c" from the end of first groove area 52a to the position close to the boundary between first groove area 52a and second groove area 52b. Moreover, cover opening/closing mechanism 5 turns in the direction of arrow "j" around rotation shaft 53 in accordance with the shift of first pin 46 in the direction of arrow "d" from the position close to the boundary between first groove area 52a and second groove area 52b to the end of first groove area 52a.

With the turn of cover opening/closing mechanism 5 in the direction of arrow "i" or "j", first gear unit 21 of cover 2 engaging with second gear unit 51 of cover opening/ closing mechanism 5 also turns in the direction of arrow "k" or arrow "l". Accordingly, cover 2 opens or closes in accordance with the turn of cover opening/closing mechanism 5. More specifically, when first gear unit 21 turns in the direction of arrow "k", cover 2 in the closed state turns in the direction of arrow "n" to come into the opened state. As a result, opening A is produced in the shift direction of combiner 3, and condition combiner 3 is allowed to project from housing 1 as illustrated in FIG. 9. On the other hand, when first gear unit 21 turns in the direction of arrow "l", cover 2 in the opened state turns in the direction of arrow "m" to come into the closed state. As a result, opening A illustrated in FIG. 9 disappears, and combiner 3 stored in housing 1 is invisible from the outside of housing 1 as illustrated in FIG. 8.

As described above, cover opening/closing mechanism 5 is rotatably disposed such that first groove area 52a corresponding to at least a part of third groove 52 extends in a direction different from an extension direction of first groove 44. Cover 2 is opened and closed by the turn of cover opening/closing mechanism 5. Accordingly, first groove area 52a may have any configurations as long as cover opening/closing mechanism 5 can turn in the direction of arrow "i" or "j" in accordance with the shift of first pin 46 along first groove 44. For example, a length of first groove area 52a in the sliding direction of first pin 46 may be determined based on a desired turn range of cover opening/closing mechanism 5 in the direction of arrow "i" or "j". More specifically, the length of first groove area 52a in the sliding direction of first pin 46 may be set to such a length that first pin 46 comes to the end of first groove area 52a in the closed state of cover 2 (e.g., FIG. 8), and that first pin 46 comes to the position close to the boundary between first groove area 52a and second groove area 52b in the opened state of cover 2 (e.g., FIG. 9).

On the other hand, as illustrated in FIG. 9, second groove area 52b formed in cover opening/closing mechanism 5 may have any configurations as long as the position and shape of second groove area 52b match with the position and shape of first groove 44 for the shift of first pin 46 along second groove area 52b. Accordingly, the turn of cover opening/closing mechanism 5 in the direction of arrow "i" or "j" is regulated during the shift of first pin 46 along second groove area 52b. Therefore, the position of cover 2 which includes first gear unit 21 engaging with second gear unit 51 of cover opening/closing mechanism 5 is kept fixed to the position of the opened state.

In this manner, head-up display device 100 achieves the opening/closing action of cover 2 in linkage with the lifting/lowering action of combiner 3 performed by first pin 46. Accordingly, the lifting/lowering action of combiner 3, and the opening/closing action of cover 2 are achievable by using one electric motor. Head-up display device 100 therefore eliminates the necessity of providing a driving mechanism for the opening/closing action of cover 2 separately from the lifting/lowering action of combiner 3, thereby reducing the size of head-up display device 100.

Moreover, the engagement between first gear unit 21 of cover 2 and second gear unit 51 of cover opening/closing mechanism 5 prevents deviation between the rotational action of cover opening/closing mechanism 5 and the opening/closing action of cover 2 from occurring.

(Modified Examples of Exemplary Embodiment)

The head-up display device according to the present disclosure is not limited to the above-described exemplary embodiment. Modified examples of the above-described exemplary embodiment are hereinafter touched upon.

<First Modified Example>

A width of angle adjustment groove area 45b illustrated in FIGS. 3 through 7 may be smaller than a width of lifting/lowering groove area 45a. In this case, a sliding load applied to second pin 47 becomes larger in angle adjustment groove area 45b than in lifting/lowering groove area 45a. This configuration therefore stabilizes the position of second pin 47 shifting in angle adjustment groove area 45b in the angle adjustable state of combiner 3, thereby reducing looseness of support unit 43 and combiner 3 caused by vibration or for other reasons. Accordingly, blurring of an image displayed on combiner 3 decreases, therefore the user can easily view the image.

<Second Modified Example>

Figure 10:
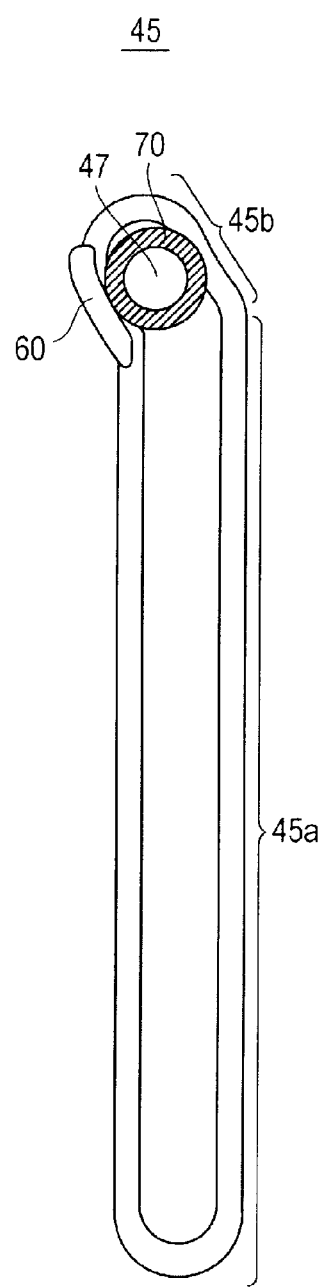
FIG. 10 is a side view illustrating a second groove according to a second modified example.

As illustrated in FIG. 10, second pin 47 may be covered by a vibration absorbing material, such as damper 70, for filling a clearance between second pin 47 and angle adjustment groove area 45b. Damper 70 may be made of silicone rubber, for example. When the clearance between second pin 47 and second groove 45 is filled in the foregoing manner, a sliding load applied to second pin 47 increases, and stabilizes the position of second pin 47 to reduce looseness of support unit 43 and combiner 3 caused by vibration or for other reasons. Accordingly, blurring of an image displayed on combiner 3 decreases, therefore the user can easily view the image.

As illustrated in FIG. 10, each of two side surface portions 49 of combiner lifting device 4 may include rib 60 which comes into contact with second pin 47 when second pin 47 slides along angle adjustment groove area 45b of second groove 45. Rib 60 provided on each side surface portion 49 of combiner lifting device 4 may be a member formed integrally with second groove 45, or a member separated from side surface portion 49 of combiner lifting device 4 and contacting second groove 45. For example, a thickness of rib 60 (length in front direction of sheet surface of FIG. 10) may be equivalent to a length between second groove 45 and a base of second pin 47. In this case, an area of contact between second pin 47 and angle adjustment groove area 45b or rib 60 increases during the shift of second pin 47 along angle adjustment groove area 45b. As a result, the sliding load applied to second pin 47 increases similarly to the above modified example. This configuration therefore stabilizes the position of second pin 47, thereby reducing looseness of support unit 43 and combiner 3 caused by vibration or for other reasons. Accordingly, blurring of an image displayed on combiner 3 decreases, therefore the user can easily view the image.

<Third modified example>

According to the first modified example or the second modified example, the sliding load applied to second pin 47 is larger in angle adjustment groove area 45b than in lifting/lowering groove area 45a. Accordingly, torque of the electric motor (e.g., stepping motor) produced may be made larger when second pin 47 is located in angle adjustment groove area 45b than when second pin 47 is located in lifting/lowering groove area 45a. For example, a detection switch may be provided to detect the position of second pin 47 based on the position of combiner 3, support unit 43, or second pin 47 in the direction of arrow "c" or "d" (position in height direction of housing 1). In this case, torque of the electric motor is controlled to be different for lifting/lowering groove area 45a and angle adjustment groove area 45b in accordance with a detection result of the detection switch. Accordingly, second pin 47 smoothly shifts with large torque in angle adjustment groove area 45b even under the large sliding load applied to second pin 47. On the other hand, the sliding load applied to second pin 47 in lifting/lowering groove area 45a is smaller than in angle adjustment groove area 45b. Therefore, second pin 47 rapidly shifts even with the small torque, thus rapid switching between the stored state and raised state of combiner 3 is achievable.

<Fourth Modified Example>

According to the exemplary embodiment described herein, angle adjustment groove area 45b illustrated in FIG. 3, for example, is provided in such a shape as to follow the route of the shift of second pin 47 in the rotational direction around first pin 46, which serves as the rotation axis, located at the upper end of first groove 44. However, the shape of angle adjustment groove area 45b is not limited to the shape illustrated in FIG. 3 and other figures. For example, angle adjustment groove area 45b may have a shape opened in the direction of arrow "a" as long as second pin 47 can shift in the rotational direction around first pin 46, which serves as the rotation axis, located at the upper end of first groove 44 in the angle adjustable state of combiner 3.

<Fifth Modified Example>

The allowable angle range of turn of combiner 3 in the direction of arrow "h" from the raised state may be determined in accordance with design of the vehicle to which combiner lifting device 4 is to be mounted, for example. As described above, the allowable angle range of rotation of combiner 3 in the direction of arrow "h" from the raised state depends on the length of angle adjustment groove area 45b in the directions of arrow "e" and arrow "f" (i.e., rotational direction of second pin 47). Accordingly, the allowable angle range of turn of combiner 3 in the direction of arrow "h" can be made larger (or smaller) when the length of angle adjustment groove area 45b in the directions of arrow "e" and arrow "f" is longer (or shorter) than the length of angle adjustment groove area 45b in the example illustrated in FIG. 7. Accordingly, the length of angle adjustment groove area 45b in the directions of arrow "e" and arrow "f" may be determined in accordance with design of the vehicle to which combiner lifting device 4 is to be mounted.

<Sixth Modified Example>

According to the above description with reference to FIGS. 8 and 9, cover 2 and cover opening/closing mechanism 5 include first gear unit 21 and second gear unit 51, respectively. However, cover 2 and cover opening/closing mechanism 5 may have configurations other than the configuration including first gear unit 21 and second gear unit 51 as long as cover 2 can open and close in accordance with turn of cover opening/closing mechanism 5.

INDUSTRIAL APPLICABILITY

The present disclosure is applicable to a head-up display device which lifts and lowers a combiner.

REFERENCE MARKS IN THE DRAWINGS

1 housing
2 cover
3 combiner
4 combiner lifting device
5 cover opening/closing mechanism
6 motor gear
21 first gear unit
41 feed screw
42 movable unit
42a combiner bracket
42b notch
43 support unit
43a body
43b combiner holding portion
44 first groove
45 second groove
45a lifting/lowering groove area (second groove area)
45b angle adjustment groove area (first groove area)
46 first pin (first projection)
47 second pin (second projection)
48 third pin
49 side surface portion
51 second gear unit
52 third groove
52a first groove area
52b second groove area
53 rotation shaft
60 rib
70 damper
100 head-up display device

The invention claimed is:

1. A combiner lifting device comprising:
a support including a first projection and a second projection, and supporting a combiner; and
two side surface portions disposed on both sides of the combiner, respectively, each of the two side surface portions provided with a first groove along which the first projection slides, and a second groove along which the second projection slides, and supporting the support in such a manner that the support is rotatable around the first projection when the first projection is located at an end of the first groove,
wherein the second groove includes a first groove area along which the second projection slides when the support rotates around the first projection located at the end of the first groove; and
wherein the second projection is covered with a damper that fills a clearance between the second projection and the first groove area.

2. The combiner lifting device according to claim 1, wherein
the second groove includes a second groove area in parallel with the first groove, and a width of the first groove area is smaller than a width of the second groove area.

3. The combiner lifting device according to claim 2, further comprising an electric motor that drives the support, wherein torque of the electric motor produced when the second projection is located in the first groove area is larger than torque of the electric motor produced when the second projection is located in the second groove area.

4. A head-up display device comprising:
the combiner lifting device according to claim 1;
a housing that houses the combiner lifting device; and
a cover that covers an upper part of the housing.

5. The head-up display device according to claim 4, further comprising a cover opening/closing mechanism provided with a third groove along which the first projection slides,
wherein the cover opening/closing mechanism is turnably disposed such that at least a part of the third groove extends in a direction different from an extension direction of the first groove, and
wherein the cover is opened and closed in accordance with turn of the cover opening/closing mechanism.

6. The head-up display device according to claim 5, wherein
the cover includes a first gear, and
the cover opening/closing mechanism includes a second gear that engages with the first gear.

7. The head-up display device according to claim 4, wherein
the second groove includes a second groove area in parallel with the first groove, and
a width of the first groove area is smaller than a width of the second groove area.

8. The head-up display device according to claim 7, further comprising an electric motor that drives the support,
wherein torque of the electric motor produced when the second projection is located in the first groove area is larger than torque of the electric motor produced when the second projection is located in the second groove area.

9. A combiner lifting device according to comprising:
a support including a first projection and a second projection, and supporting a combiner; and
two side surface portions disposed on both sides of the combiner, respectively, each of the two side surface portions provided with a first groove along which the first projection slides, and a second groove along which the second projection slides, and supporting the support in such a manner that the support is rotatable around the first projection when the first projection is located at an end of the first groove, wherein:
the second groove includes a first groove area along which the second projection slides when the support rotates around the first projection located at the end of the first groove, and
each of the two side surface portions includes a rib that comes into contact with the second projection when the second projection slides along the first groove area.

10. The combiner lifting device according to claim 9, wherein:
the second groove includes a second groove area in parallel with the first groove, and
a width of the first groove area is smaller than a width of the second groove area.

11. The combiner lifting device according to claim 10, further comprising an electric motor that drives the support, wherein torque of the electric motor produced when the second projection is located in the first groove area is larger than torque of the electric motor produced when the second projection is located in the second groove area.

12. A head-up display device comprising:
a combiner lift;
a housing that houses the combiner lift;
a cover that covers an upper part of the housing; and
a cover opening/closing mechanism provided with a third groove along which a first projection slides,
wherein the combiner lift comprises:
a support including the first projection and a second projection, and supporting a combiner; and
two side surface portions disposed on both sides of the combiner, respectively, each of the two side surface portions provided with a first groove along which the first projection slides, and a second groove along which the second projection slides, and supporting the support in such a manner that the support is rotatable around the first projection when the first projection is located at an end of the first groove,
the cover opening/closing mechanism is turnably disposed such that at least a part of the third groove extends in a direction different from an extension direction of the first groove, and
the cover is opened and closed in accordance with turn of the cover opening/closing mechanism.

13. The head-up display device according to claim 12, wherein the second groove includes a first groove area and a second groove area, the second groove area is in parallel with the first groove, and
a width of the first groove area is smaller than a width of the second groove area.

14. The head-up display device according to claim 13, further comprising an electric motor that drives the support,
wherein torque of the electric motor produced when the second projection is located in the first groove area is larger than torque of the electric motor produced when the second projection is located in the second groove area.

* * * * *